US006982776B2

(12) United States Patent
Nagano et al.

(10) Patent No.: US 6,982,776 B2
(45) Date of Patent: Jan. 3, 2006

(54) IN-PLANE-SWITCHING MODE ACTIVE MATRIX LIQUID CRYSTAL DISPLAY DEVICE AND METHOD OF MANUFACTURING THE SAME

(75) Inventors: Shingo Nagano, Kikuchi-gun (JP); Yuichi Masutani, Kikuchi-gun (JP)

(73) Assignee: Advanced Display Inc., Kikuchi-gun (JP)

( * ) Notice: Subject to any disclaimer, the term of this patent is extended or adjusted under 35 U.S.C. 154(b) by 29 days.

(21) Appl. No.: 10/407,427

(22) Filed: Apr. 7, 2003

(65) Prior Publication Data

US 2003/0193639 A1     Oct. 16, 2003

(30) Foreign Application Priority Data

Apr. 15, 2002   (JP)   ............................. 2002-112737

(51) Int. Cl.
  *G02F 1/1343*   (2006.01)
  *G02F 1/136*    (2006.01)
  *G02F 1/1333*   (2006.01)
  *H01L 29/04*    (2006.01)

(52) U.S. Cl. ..................... 349/141; 349/43; 349/138; 257/59

(58) Field of Classification Search .................. 349/42, 349/43, 138, 141; 257/59, 72
  See application file for complete search history.

(56) References Cited

U.S. PATENT DOCUMENTS

| 5,907,379 | A | * | 5/1999 | Kim et al. | 349/141 |
|---|---|---|---|---|---|
| 6,091,473 | A | * | 7/2000 | Hebiguchi | 349/141 |
| 6,114,184 | A | * | 9/2000 | Matsumoto et al. | 438/30 |
| 6,208,399 | B1 | * | 3/2001 | Ohta et al. | 349/139 |
| 6,630,977 | B1 | * | 10/2003 | Yamazaki et al. | 349/141 |
| 6,704,082 | B2 | * | 3/2004 | Tomioka et al. | 349/123 |
| 6,784,965 | B2 | * | 8/2004 | Kim et al. | 349/141 |
| 6,830,494 | B1 | * | 12/2004 | Yamazaki et al. | 445/24 |
| 2001/0012648 | A1 | * | 8/2001 | Lee | 438/149 |
| 2001/0032986 | A1 | * | 10/2001 | Miyasaka | 257/192 |
| 2002/0008799 | A1 | * | 1/2002 | Ota et al. | 349/43 |
| 2002/0171796 | A1 | * | 11/2002 | Kim | 349/141 |
| 2002/0191138 | A1 | * | 12/2002 | Matsumoto et al. | 349/141 |
| 2003/0086044 | A1 | * | 5/2003 | Inoue et al. | 349/141 |
| 2004/0046919 | A1 | * | 3/2004 | Kim | 349/141 |
| 2004/0080700 | A1 | * | 4/2004 | Kang | 349/141 |

FOREIGN PATENT DOCUMENTS

JP    8-254712    10/1996

OTHER PUBLICATIONS

M. Oh-E, et al. "Principles and Characteristics of Electro-Optical Behaviour With In-Plane Switching Mode" Asia Display '95, pp. 577-580.

* cited by examiner

*Primary Examiner*—Tarifur R. Chowdhury
(74) *Attorney, Agent, or Firm*—Oblon, Spivak, McClelland, Maier & Neustadt, P.C.

(57) ABSTRACT

A liquid crystal display device of so-called an In-Plane Switching mode in which an electric field substantially parallel to substrates is applied to a liquid crystal layer by applying a voltage between a pixel electrode and a common electrode is disclosed. In the liquid crystal display device, a source line is overlapped with a part of a common electrode with an insulation film interposed therebetween. The insulation film has a plurality of layers of insulation films.

5 Claims, 11 Drawing Sheets

FIG. 1A
PRIOR ART
FIG. 1B
PRIOR ART
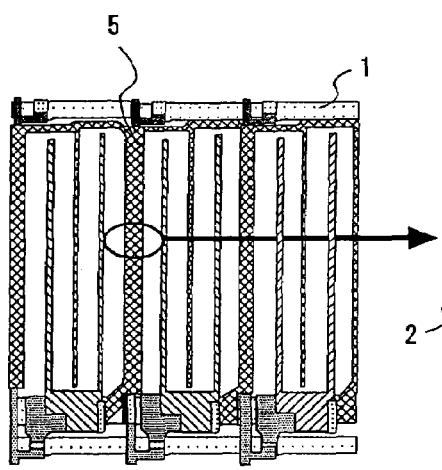
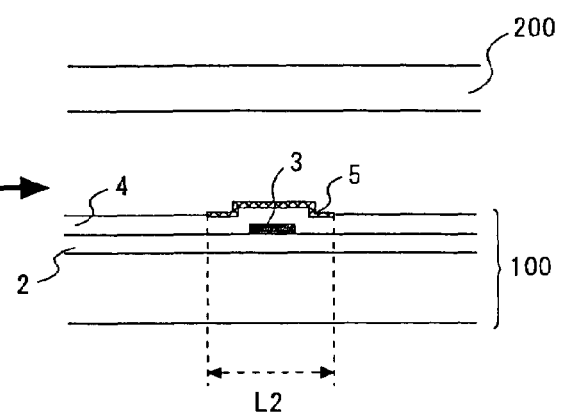

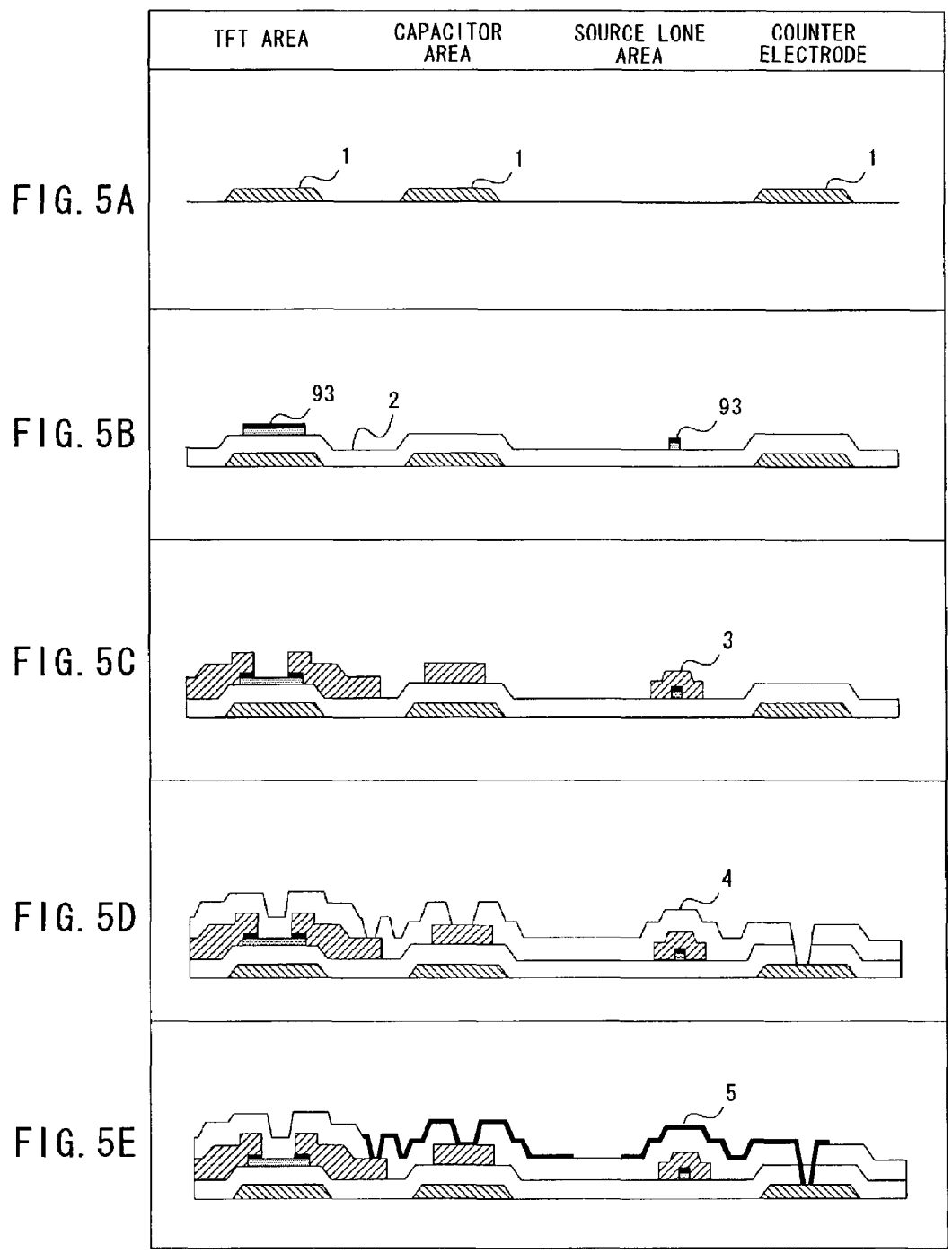

FIG. 13A
PRIOR ART
FIG. 13B
PRIOR ART
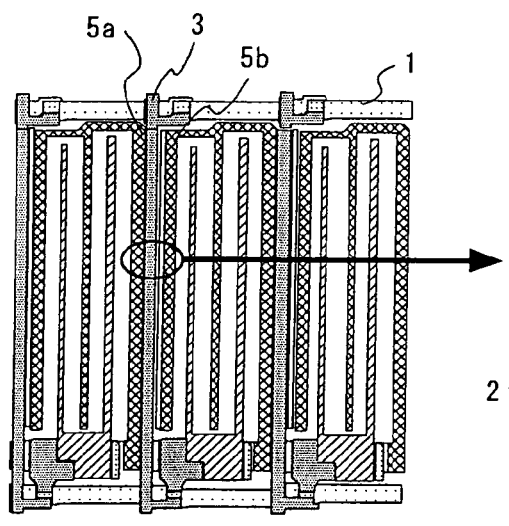
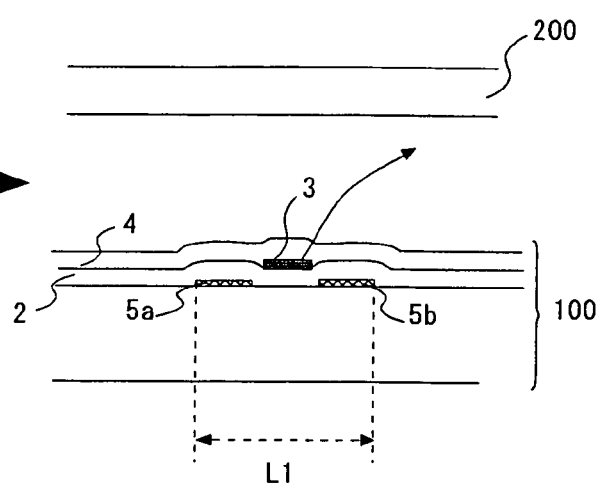

IN-PLANE-SWITCHING MODE ACTIVE MATRIX LIQUID CRYSTAL DISPLAY DEVICE AND METHOD OF MANUFACTURING THE SAME

BACKGROUND OF THE INVENTION

1. Field of the Invention

The present invention relates to an In-Plane Switching mode active matrix liquid crystal display device and a method of manufacturing the same.

2. Related Background Art

Recently, In-Plane Switching mode in which an electric field parallel to a substrate is applied to liquid crystal is employed in an active matrix liquid crystal display device for obtaining an extremely wide viewing angle, as disclosed in Japanese Patent Application Laid-Open No. H08-254712. In-Plane Switching mode operation minimizes viewing-angle-based gray-scale inversion and deterioration in contrast ratio (reference: M. Oh-e et. al., Asia Display 1995. pp. 577–580). FIG. 13A is a plan view showing a pixel area of a conventional In-Plane Switching mode liquid crystal display device, and FIG. 13B is an enlarged sectional view showing a part of the same. In FIGS. 13A and 13B, reference numeral 100 designates a Thin Film Transistor (TFT) array substrate, and 200, a color filter (CF) substrate. Reference numeral 1 designates a gate line that is a plurality of scanning lines formed on an insulating substrate, 2 a gate insulation film, 3 a source line, 4 an insulation film formed on the source line 3, and 5a and 5b common electrodes formed on the same layer as the gate line. As shown in FIG. 13B, the common electrode 5 is separated into the common electrodes 5a and 5b. In this configuration, a voltage applied to the source line generates an electric field E, changing an alignment condition of the liquid crystal placed between the TFT array substrate 100 and the CF substrate 200. Therefore, the width L1 in FIG. 13B has to be wide in the configuration shown in FIGS. 13A and 13B, and light transmission is thus limited, which causes a problem of low aperture ratio.

In order to solve the above problem, a configuration shown in FIGS. 1A and 1B has been proposed. In this configuration, the source line 3 and the common electrode 5 are overlapped with each other, the source line 3 covered with the common electrode 5. Therefore, an electric field generated from the source line 3 is blocked by the common electrode 5 not to reach the liquid crystal, thereby reducing change in an alignment condition of the liquid crystal. Accordingly, the width L2 to limit light transmission can be small, thus attaining high aperture ratio.

SUMMARY OF THE INVENTION

However, the configuration shown in FIGS. 1A and 1B has a problem of a short-circuit between the source line 3 and the common electrode 5. As shown in FIG. 4A, pinhole defects 41 and 42 between the source line 3 and the common electrode 5 cause the short-circuit.

The present invention has been accomplished to solve the above problem and an object of the present invention is thus to provide a liquid crystal display device to prevent a short-circuit between a source line and a common electrode, and a method of manufacturing the same.

A liquid crystal display device according to the present invention is a liquid crystal display device having a pair of substrates placed oppositely at a certain distance away from each other; a thin film of liquid crystal placed between the substrates; a gate line and a source line formed on one of the substrates, the gate line and the source line crossing each other; a switching element connected to the gate line and the source line; a comb-shaped pixel electrode connected to the switching element, the pixel electrode having a plurality of electrodes parallel to the source line; and a comb-shaped common electrode connected to the switching element, the common electrode having a plurality of electrodes parallel to and alternating with the plurality of electrodes of the pixel electrode; the liquid crystal display device applying an electric field substantially parallel to the substrates to the liquid crystal by applying a voltage across the pixel electrode and the common electrode, wherein the source line is overlapped with a part of the common electrode with an insulation film interposed therebetween, the insulation film having a plurality of layers of insulation film. This configuration significantly reduces probability of short-circuit occurrence between the source line and the common electrode.

It is preferable that the insulation film is formed in a plurality of times of film deposition processes.

It is also preferable that a cleaning process is performed between the film deposition processes for forming the insulation film in order to eliminate contaminants.

The cleaning process preferably includes a brush cleaning process for effective cleaning.

In a preferred embodiment, the comb-shaped pixel electrode and the comb-shaped common electrode are V-shaped, bent at a middle of a pixel. The zigzag electrode structure drives liquid crystal in two directions, thereby overcoming a problem of reduced viewing angle characteristics in a certain direction in an In-Plane Switching mode liquid crystal panel.

It is preferable that the common electrode is overlapped with the source line in an area except the middle of the pixel, while not overlapped with the source line at the middle of the pixel. The configuration effectively prevents a short-circuit between the source line and the common electrode at the bent portion where defects are likely to occur.

It is also preferable that at least two pieces of the comb-shaped pixel electrode are directly connected to the switching element. In this configuration, even if a part of the pixel electrode has a defect, it does not become a point defect unless both of the two pixel electrodes have defects; therefore, high manufacturing yield is achieved.

In a preferred embodiment, there are at least two different values for an absolute value of an angle between the pixel electrode and a rubbing direction, and an absolute value of an angle between an edge portion of the pixel electrode and the rubbing direction is greater than an absolute value of an angle between the other portion of the pixel electrode and the rubbing direction. This configuration controls the direction of an electric field in the edge portion of the pixel electrode towards the direction to which liquid crystal molecules are to rotate. It is therefore possible to change a rotating direction of liquid crystal molecules that have counterrotated due to loading into the right direction. In this configuration, such a defect that display troubles due to loads applied to a display surface remains for a long time after removal of the loads is reduced, improving display quality.

It is preferable here that a position where at least a part of side surfaces of the source line and a semiconductor layer of the switching element are aligned in a vertical direction is not on an area where the source line is overlapped with the common electrode. This configuration achieves higher pressure resistance between layers.

A common capacitor line connected to the common electrode is independent between pixels not to be overlapped with the source electrode. The number of steps over which the source line crosses is thus reduced. This configuration reduces probability of braking of the source line, achieving high manufacturing yield.

Another liquid crystal display device according to the present invention is a liquid crystal display device having a pair of substrates placed oppositely at a certain distance away from each other; a thin film of liquid crystal placed between the substrates; a gate line and a source line formed on one of the substrates, the gate line and the source line crossing each other; a switching element connected to the gate line and the source line; a comb-shaped pixel electrode connected to the switching element, the pixel electrode having a plurality of electrodes parallel to the source line; and a comb-shaped common electrode connected to the switching element, the common electrode having a plurality of electrodes parallel to and alternating with the plurality of electrodes of the pixel electrode; the liquid crystal display device applying an electric field substantially parallel to the substrates to the liquid crystal by applying a voltage across the pixel electrode and the common electrode, wherein the source line is overlapped with a part of the common electrode with an insulation film interposed therebetween, and the common electrode is overlapped with the source line in an area except the middle of a pixel, while not overlapped with the source line at the middle of the pixel. The configuration effectively prevents a short-circuit between the source line and the common electrode at the bent portion where defects are likely to occur.

Another liquid crystal display device according to the present invention is a liquid crystal display device having a pair of substrates placed oppositely at a certain distance away from each other; a thin film of liquid crystal placed between the substrates; a gate line and a source line formed on one of the substrates, the gate line and the source line crossing each other; a switching element connected to the gate line and the source line; a comb-shaped pixel electrode connected to the switching element, the pixel electrode having a plurality of electrodes parallel to the source line; and a comb-shaped common electrode connected to the switching element, the common electrode having a plurality of electrodes parallel to and alternating with the plurality of electrodes of the pixel electrode; the liquid crystal display device applying an electric field substantially parallel to the substrates to the liquid crystal by applying a voltage across the pixel electrode and the common electrode, wherein a position where at least a part of side surfaces of the source line and a semiconductor layer of the switching element are aligned in a vertical direction is not on an area where the source line is overlapped with the common electrode. This configuration achieves higher pressure resistance between layers.

A method of manufacturing a liquid crystal display device according to the present invention is a method of manufacturing a liquid crystal display device having a pair of substrates placed oppositely at a certain distance away from each other; a thin film of liquid crystal placed between the substrates; a gate line and a source line formed on one of the substrates, the gate line and the source line crossing each other; a switching element connected to the gate line and the source line; a comb-shaped pixel electrode connected to the switching element, the pixel electrode having a plurality of electrodes parallel to the source line; and a comb-shaped common electrode connected to the switching element, the common electrode having a plurality of electrodes parallel to and alternating with the plurality of electrodes of the pixel electrode; the liquid crystal display device applying an electric field substantially parallel to the substrates to the liquid crystal by applying a voltage across the pixel electrode and the common electrode, having a step of forming the source line; a step of forming a plurality of insulation films by a plurality of film deposition processes; and a step of forming the common electrode overlapped with the source line with the insulation films interposed therebetween. This configuration significantly reduces probability of short-circuit occurrence between the source line and the common electrode.

It is preferable that the step of forming the insulation films has a cleaning process between the plurality of film deposition processes for forming the insulation films in order to eliminate contaminants.

The cleaning process preferably includes a brush cleaning process for effective cleaning.

The present invention will become more fully understood from the detailed description given hereinbelow and the accompanying drawings which are given by way of illustration only, and thus are not to be considered as limiting the present invention.

BRIEF DESCRIPTION OF THE DRAWINGS

FIGS. 1A and 1B are views to show a pixel area of a liquid crystal display device according to the present invention.

FIGS. 5A to 5E are views to show a manufacturing flowchart of the liquid crystal display device according to the present invention.

FIGS. 13A and 13B are views to show a pixel area of a conventional liquid crystal display device.

DESCRIPTION OF THE PREFERRED EMBODIMENTS

First Embodiment

A basic configuration of a liquid crystal display device according to the present invention has a configuration similar to that of a conventional liquid crystal display device, shown in FIGS. 1A and 1B for example. More specifically, a color filter (CF) substrate and a thin film transistor (TFT) substrate are placed oppositely at a certain distance away from each other. A liquid crystal layer is placed between those substrates. A gate line and a source line crossing each other are formed on one of the substrates. There is also formed a switching element such as a TFT element connected to the gate line and the source line. Formed in the switching element are a V-shaped comb-type pixel electrode consisting of a plurality of electrodes provided parallel to the source line, and a V-shaped comb-type common electrode consisting of a plurality of electrodes arranged parallel to and alternating with the plurality of electrodes of the pixel electrode. When a voltage is applied across the pixel electrode and the common electrode, an electric field substantially parallel to the substrates is applied to the liquid crystal layer.

Figure 2:
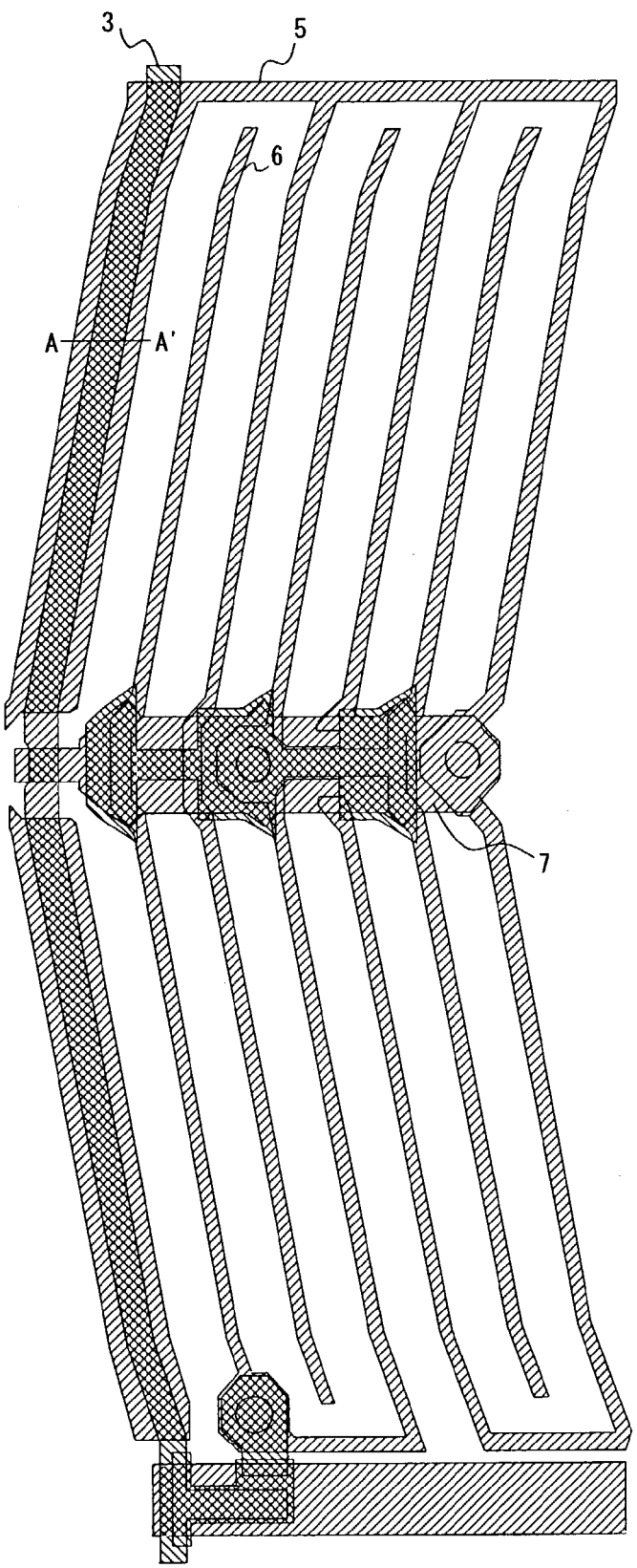
FIG. 2 is a view to show a pixel area of the liquid crystal display device according to the present invention.

FIG. 2 shows an enlarged view of a pixel area of the liquid crystal display device according to the present invention. In FIG. 2, the same elements as those in FIGS. 1A and 1B are denoted by the same reference numerals and redundant description will be omitted. In FIG. 2, reference numeral 5 designates a V-shaped comb-type common electrode, which is also called a counter electrode, consisting of a plurality of electrodes arranged parallel to and alternating with a plurality of electrodes of the pixel electrode 6 which will be explained later. Reference numeral 6 designates a V-shaped comb-type pixel electrode consisting of a plurality of electrodes connected to a thin film transistor and provided parallel to the source line 3, which is formed by metal such as chromium (Cr) or a transparent conductive film such as Indium Tin Oxide (ITO). Reference numeral 7 designates a common capacitor line formed by metal such as chromium (Cr) and connected to the common electrode 5 via a through hole. As shown in FIG. 2, the source line 3 and the common electrode 5 provided between pixels adjoining horizontally, which is, in a direction of an electric field, are overlapped with each other. That is, the common electrode 5 covers the source line 3 with an insulation film 4 interposed therebetween.

Figure 3:
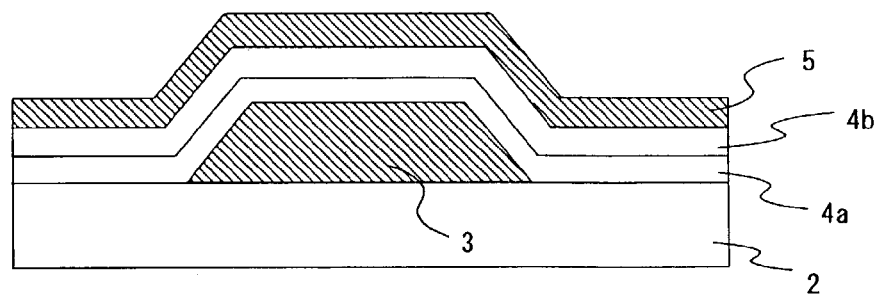
FIG. 3 is a sectional view of an overlap of a source electrode with a common electrode in a pixel area of the liquid crystal display device according to the present invention.

FIG. 3 shows a cross-sectional view along line A–A' in FIG. 2. As shown in FIG. 3, a source line 3 is formed on a gate insulation film 2 that is a film of SiN or the like. The source line 3 is 400 nm to 500 nm thick, for example. The first insulation film 4a is formed on the source line 3. The first insulation film 4a is 200 nm to 300 nm thick, for example. The second insulation film 4b is further formed on the first insulation film 4a. The second insulation film 4b is 200 nm to 300 nm thick, for example. A common electrode 5 is formed on the second insulation film 4b. The common electrode 5 is 100 nm thick, for example. The source line 3 and the common electrode 5 are thus separated by the two insulation films 4a and 4b. The insulation films 4a and 4b are films of SiN or SiO$_2$.

As described above, two layers of insulation films are formed between the source line 3 and the common electrode 5 by two times of film deposition processes. A brush cleaning process is performed between the processes of depositing the first insulation film 4a and depositing the second insulation film 4b in order to eliminate contaminants. The use of a brush is effective in elimination of contaminants. Even if the brush cleaning process removes a part of the first insulation film 4a, the insulation film 4b formed after the cleaning process allows complete insulation between the source line 3 and the common electrode 5.

Figure 4A:
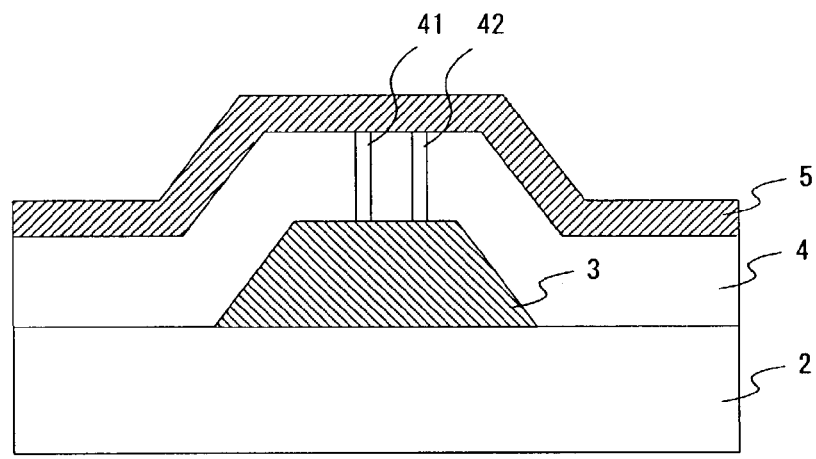
FIGS. 4A and 4B are views to explain a short-circuit of a source electrode and a common electrode in the liquid crystal display device according to the present invention.
Figure 4B:
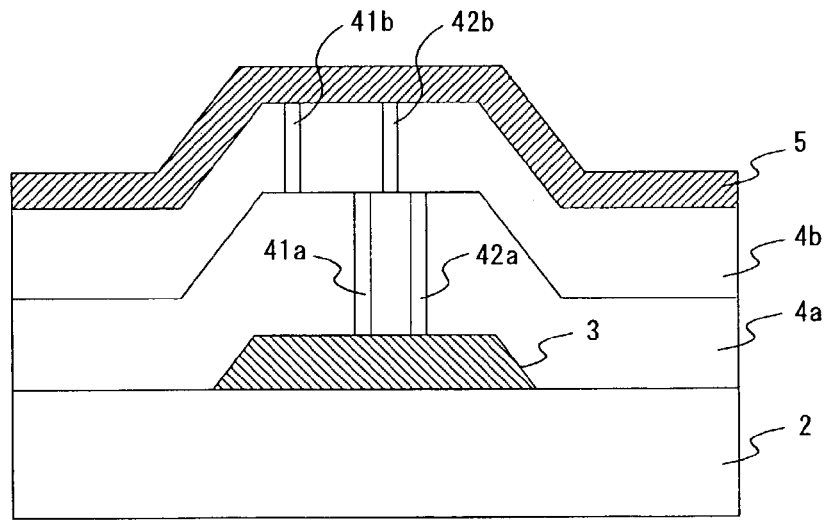

Effect of forming a plurality of layers of the insulation film 4 will be explained hereinafter with reference to FIGS. 4A and 4B. Pinhole defects 41a and 42a in the first insulation film 4a are inevitable in a configuration shown in FIG. 4B as well as in a configuration shown in FIG. 4A. Pinhole defects 41b and 42b in the second insulation film 4b are also inevitable. In the configuration shown in FIG. 4A, however, the pinhole defects 41 and 42 immediately cause a short-circuit between the source line 3 and the common electrode 5. In the configuration shown in FIG. 4B, on the other hand, a short-circuit between the source line 3 and the common electrode 5 occurs only when the pinhole defects 41a and 42a in the first insulation film 4a and the pinhole defects 41b and 42b in the second insulation film 4b have continuity. Therefore, probability of short-circuit occurrence between the source line 3 and the common electrode 5 is significantly low in the configuration according to the first embodiment of the present invention shown in FIG. 4B than in the configuration shown in FIG. 4A.

Although two layers of the insulation films are formed between the source line 3 and the common electrode 5 in this case, the same effect can be obtained by more than three layers of the insulation films. Besides, though the source line as well as the pixel electrode is bent to be V-shaped in the case explained above, the same effect can be obtained when the source line is not bent.

In the following, a manufacturing flowchart of the liquid crystal display device according to the first embodiment of the present invention will be explained with reference to FIG. 5A to 5E.

First, as shown in FIG. 5A, Cr, Al, Ti, Ta, Mo, W, Ni, Cu, Au, Ag, or an alloy comprised mainly of those, a conductive film transmitting light such as Indium Tin Oxide (ITO), or a multi-layer film of those is deposited on an insulating substrate by sputtering or vapor deposition. A gate line 1, a gate electrode 1, and a common capacitor line are then formed by a photolithography process. Next, as shown in FIG. 5B, a gate insulation film 2 of silicon nitride or the like is deposited. Further, a semiconductor layer 93 of amorphous silicon (a-Si), polysilicon (poly-Si), or the like, and, in a N-type TFT, a contact layer of n$^+$a-Si, n$^+$poly-Si, or the like, which is highly doped with impurity such as P, are successively deposited by plasma chemical vapor deposition (CVD), atmospheric pressure CVD, or low-pressure CVD, for example. Then, the contact layer and the semiconductor layer 93 are formed to be island-shaped.

In the second place, as shown in FIG. 5C, Cr, Al, Ti, Ta, Mo, W, Ni, Cu, Au, Ag, or an alloy comprised mainly of those, a conductive film transmitting light such as ITO, or a multi-layer film of those is deposited by sputtering or vapor deposition. A source line 3, a source electrode, a drain electrode, and storage capacitor electrode are then formed by a photolithography process and microfabrication technique. Then, the contact layer is etched away from a channel region, using the source electrode and the drain electrode, or a photoresist used for forming those, as an etch mask.

In the third place, as shown in FIG. 5D, an insulation film 4 of silicon nitride, silicon oxide, inorganic insulation film, or organic resin is deposited. Two layers of the insulation film 4, the first insulation film 4a and the second insulation film 4b, are formed by two times of film deposition processes as explained above with reference to FIG. 3. Then, a contact hole is formed by a photolithography process and a subsequent etching process.

Finally, as shown in FIG. 5E, Cr, Al, Ti, Ta, Mo, W, Ni, Cu, Au, Ag, or an alloy comprised mainly of those, a conductive film transmitting light such as ITO, or a multi-layer film of those is deposited, and then patterned to form a pixel electrode and a counter electrode 5.

The processes explained above produces a TFT substrate constituting an In-Plane Switching mode liquid crystal display device. Liquid crystal is filled between the TFT substrate and an opposite substrate, and the two substrates are joined with an adhesive seal material. Here, liquid crystal molecules are aligned at a certain angle by rubbing, photo-alignment, or any other known method. Then, a gate line drive circuit, a source line drive circuit, and a common capacitor line power source are connected, respectively, to the gate line, the source line, and the common capacitor line, thereby producing a liquid crystal display device.

Second Embodiment

Figure 6:
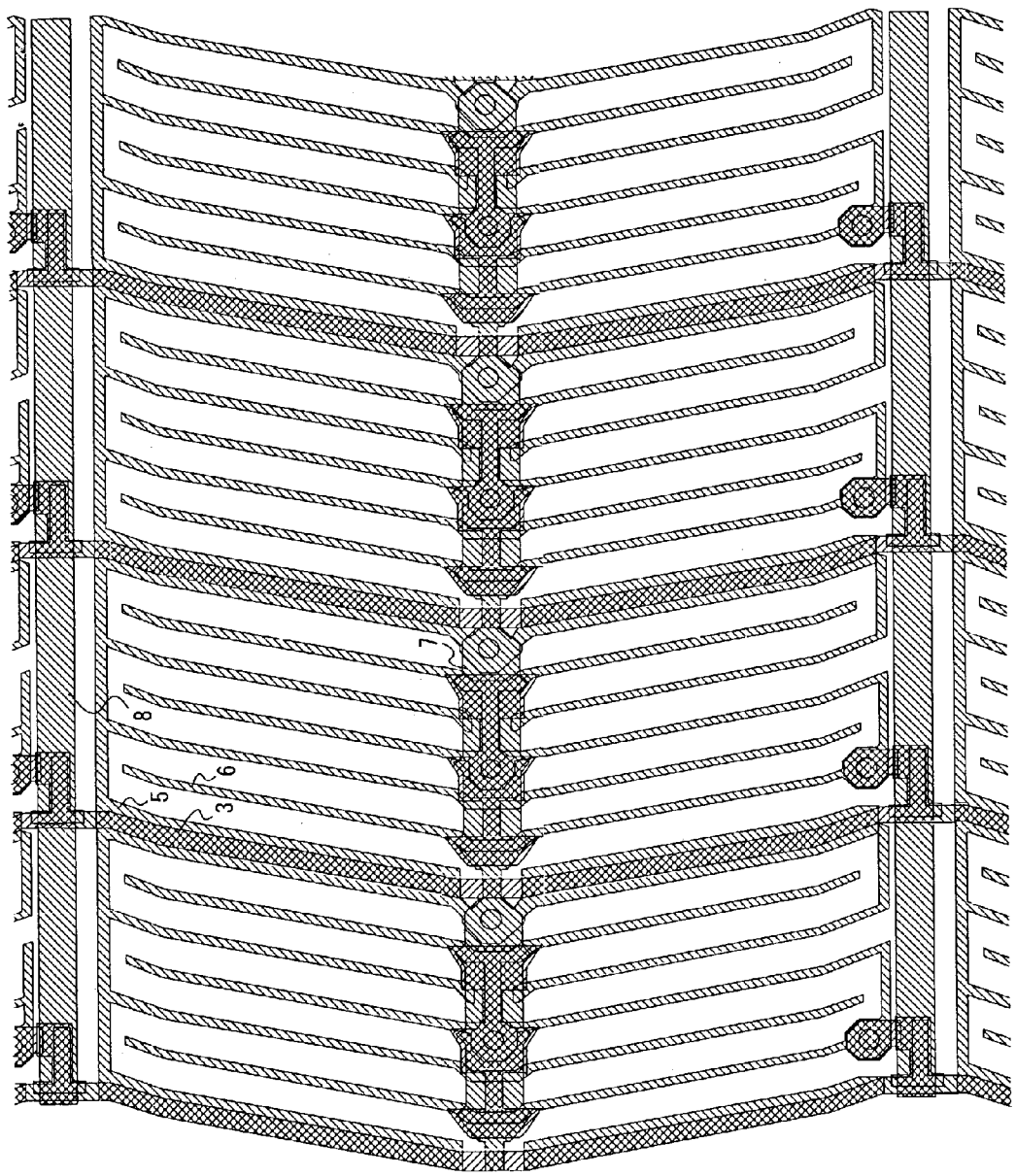
FIG. 6 is a view to show a pixel area of the liquid crystal display device according to the present invention.

FIG. 6 shows a pixel area of a liquid crystal display device according to the second embodiment of the present invention. The pixel area shown in FIG. 6 has the same configuration as the pixel area shown in FIGS. 1A and 1B, the source line 3 and the common electrode 5 overlapped with each other. In this embodiment, the source line 3, the common electrode 5, and the pixel electrode 6 are V-shaped, bent at its middle. The bent portion is in an area of a common capacitor line 7. The zigzag electrode structure drives liquid crystal in two directions, thereby overcoming a problem of reduced viewing angle characteristics in a certain direction in an In-plane Switching mode liquid crystal panel.

Though the common electrode 5 is arranged to cover the source line 3, it is configured not to cover the source line 3 at the middle part. That is, the common electrode 5 is overlapped with the source line 3 in the area except the middle of a pixel, while not overlapped with the source line 3 at the middle of the pixel. The configuration in which the source line 3 and the common electrode 5 are not overlapped at the bent portion effectively prevents a short-circuit between the source line 3 and the common electrode 5 at the bent portion where defects are likely to occur.

If, on the other hand, the source line 3 and the common electrode 5 are overlapped with each other at the bent portion also, it is preferable to form a plurality of layers of an insulation film between the source line 3 and the common electrode 5, as explained in the first embodiment of the present invention. This is because the bent portion is subject to defects, and a short-circuit between the source line 3 and the common electrode 5 are thus likely to occur there.

Third Embodiment

Figure 7:
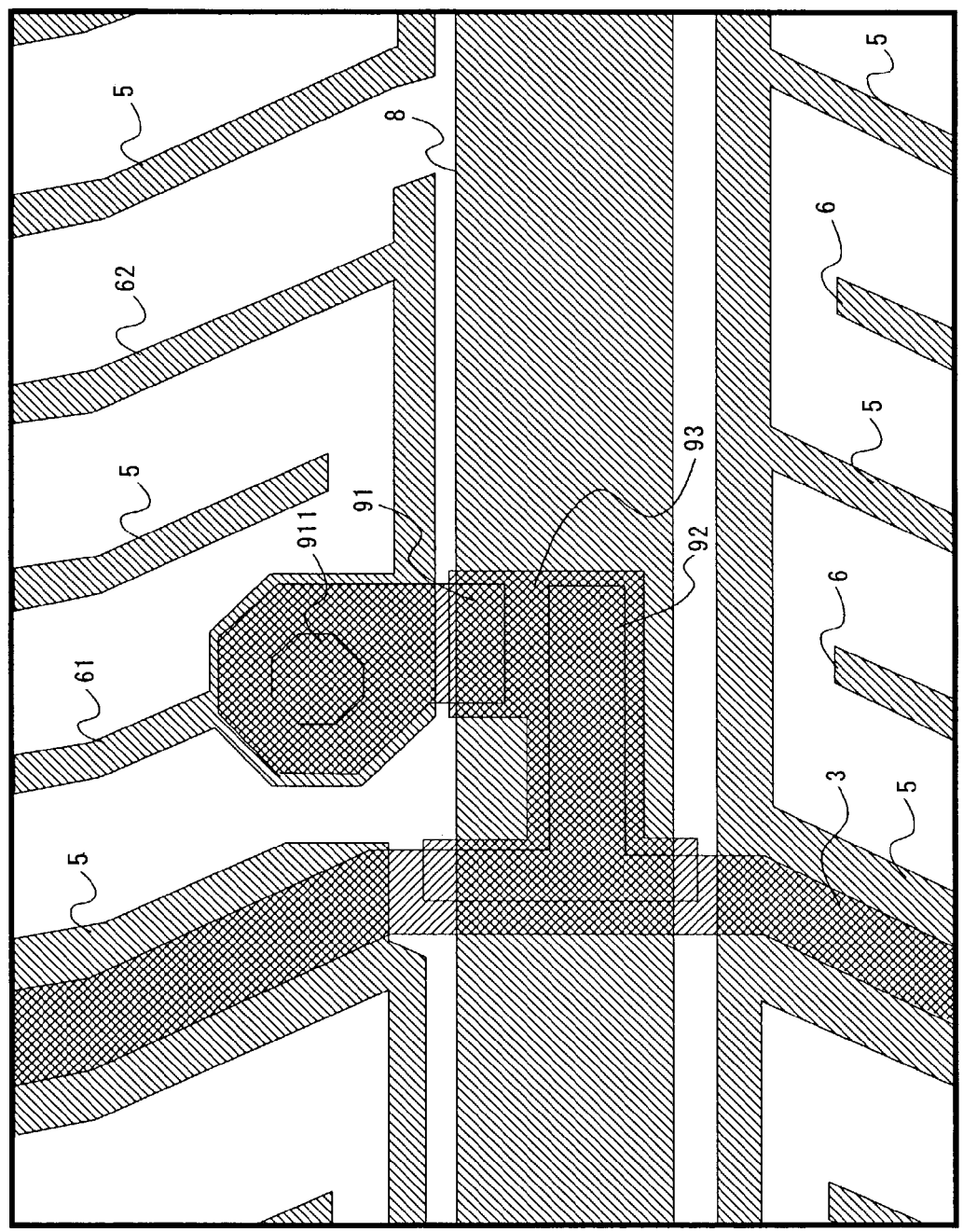
FIG. 7 is a view to show a pixel area of the liquid crystal display device according to the present invention.

FIG. 7 shows a pixel area of a liquid crystal display device according to the third embodiment of the present invention to explain a configuration of a TFT. As shown in FIG. 7, the TFT is comprised of a drain electrode 91, a source electrode 92, a semiconductor layer 93 of a-Si, and a gate electrode 8. The drain electrode 91 is connected to the pixel electrode 6 via a through hole 911. The pixel electrode 6 is comb-shaped, and two pixel electrodes, a pixel electrode 61 and a pixel electrode 62, are arranged with the common electrode 5 placed therebetween. The drain electrode 91 is therefore connected to the two pixel electrodes 61 and 62. In this configuration, even if a part of the pixel electrode has a defect, it does not become a point defect unless both of the two pixel electrodes have defects; therefore, high manufacturing yield is achieved.

Fourth Embodiment

Figure 8:
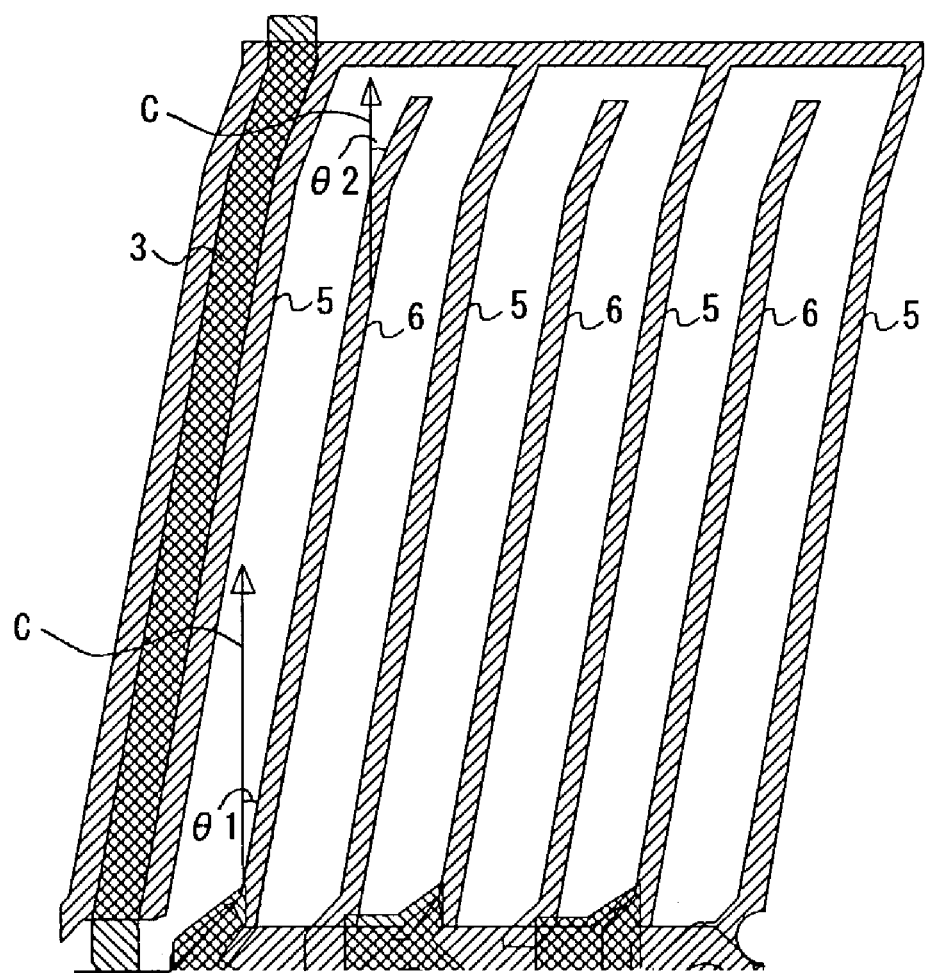
FIG. 8 is a view to show a pixel area of the liquid crystal display device according to the present invention.

FIG. 8 shows a configuration of a pixel area of a liquid crystal display device according to the fourth embodiment of the present invention. In FIG. 8, reference symbol C designates a rubbing direction. There are two different values θ1 and θ2 for an absolute value of an angle between the common electrode or the pixel electrode, and the rubbing direction as shown in FIG. 8. An absolute value of an angle between an edge portion of the pixel electrode 6 and the rubbing direction is greater than an absolute value of an angle between the other portion of the pixel electrode 6 and the rubbing direction. This configuration controls the direction of an electric field in the edge portion of the pixel electrode 6 towards the direction to which liquid crystal molecules are to rotate. It is therefore possible to change a rotating direction of liquid crystal molecules that have counterrotated due to loading into the right direction. In this configuration, such a defect that display troubles due to loads applied to a display surface remains for a long time after removal of the loads is reduced, improving display quality. Besides, the configuration eliminates the need for a protection plate to prevent application of loads onto a display surface, thereby reducing manufacture costs.

Fifth Embodiment

Figure 9:
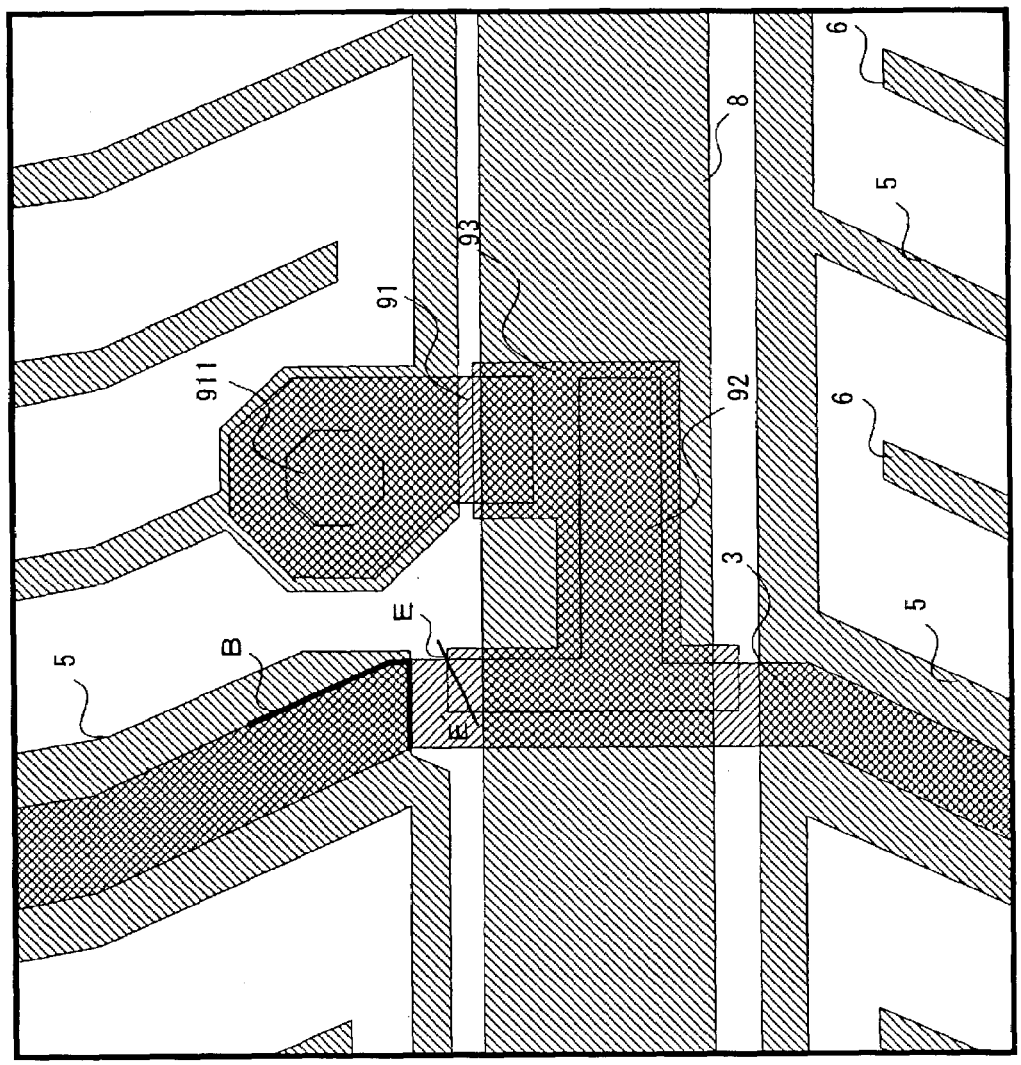
FIG. 9 is a view to show a pixel area of the liquid crystal display device according to the present invention.
Figure 10A:
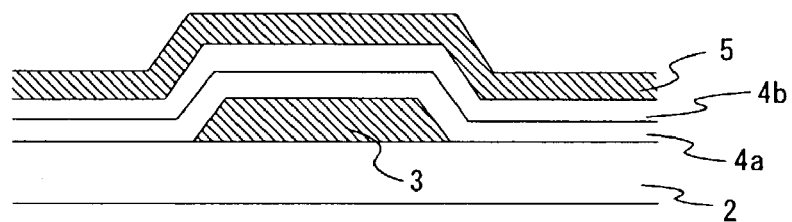
FIGS. 10A and 10B are views to explain effect of overlap of a semiconductor layer with a source line and a common electrode.

FIG. 9 shows a pixel area of a liquid crystal display device according to the fifth embodiment of the present invention to explain a configuration of a TFT. As shown in FIG. 9, the TFT is comprised of a drain electrode 91, a source electrode 92, a semiconductor layer 93 of a-Si, and a gate electrode 8. Reference symbol E in FIG. 9 is a position where at least a part of side surfaces of the source line 3 and the semiconductor layer 93 are aligned in the vertical direction, that is, the direction perpendicular to the paper surface. The position E is not on the area where the source line 3 is overlapped with the common electrode 5. That is, the position E is outside of an edge B that is an edge of the part where the source line 3 is overlapped with the common electrode 5. FIG. 10A shows a cross-section along line E–E' including the position E.

Figure 10B:
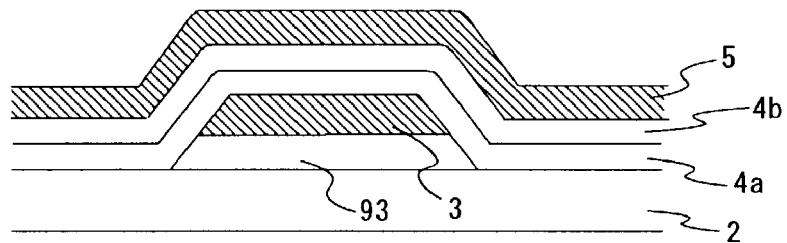

If the position E is on the area where the source line 3 is overlapped with the common electrode 5, on the other hand, a cross-section is as shown in FIG. 10B. Because of the semiconductor layer 93, the configuration shown in FIG. 10B has the thicker middle part than the configuration shown in FIG. 10A does. A peripheral part, which does not have the source line 3 and the semiconductor layer 93, is the same in height in the configurations shown in FIGS. 10A and 10B. Therefore, the height difference between the middle part and the peripheral part is greater in the configuration shown in FIG. 10B than in that shown in FIG. 10A, which results in reduced pressure resistance between layers.

Consequently, a liquid crystal display device according to the present embodiment of the invention has such a configuration that the position E where at least a part of side surfaces of the source line 3 and the semiconductor layer 93 are aligned in the vertical direction is not on the area where the source line 3 is overlapped with the common electrode 5. This configuration achieves higher pressure resistance between layers.

Figure 11A:
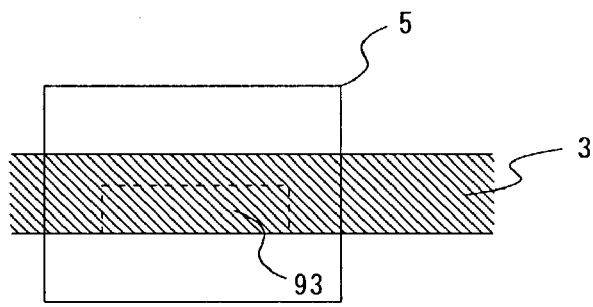
FIGS. 11A and 11B are views to show an example of a configuration in which a semiconductor layer is overlapped with a source line and a common electrode.
Figure 11B:
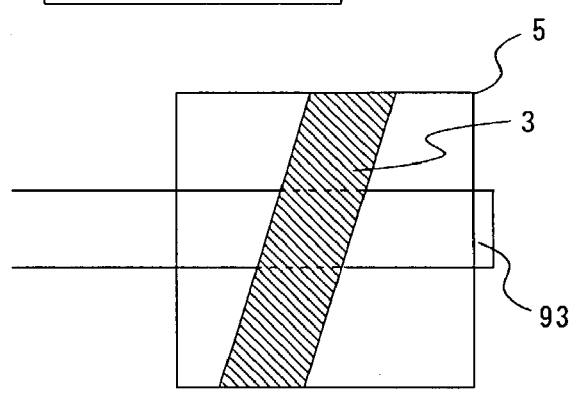

FIGS. 11A and 11B show configurations where the position E is on the area where the source line 3 is overlapped with the common electrode 5. In the configuration shown in FIG. 11A, the semiconductor layer 93 is inside of the source line 3, their one side surfaces vertically aligned, being on the area where the source line 3 is overlapped with the common electrode 5. In the configuration shown in FIG. 11B, the semiconductor layer 93 crosses the source line 3, the crossing part being on the area where the source line 3 is overlapped with the common electrode 5.

Sixth Embodiment

Figure 12:
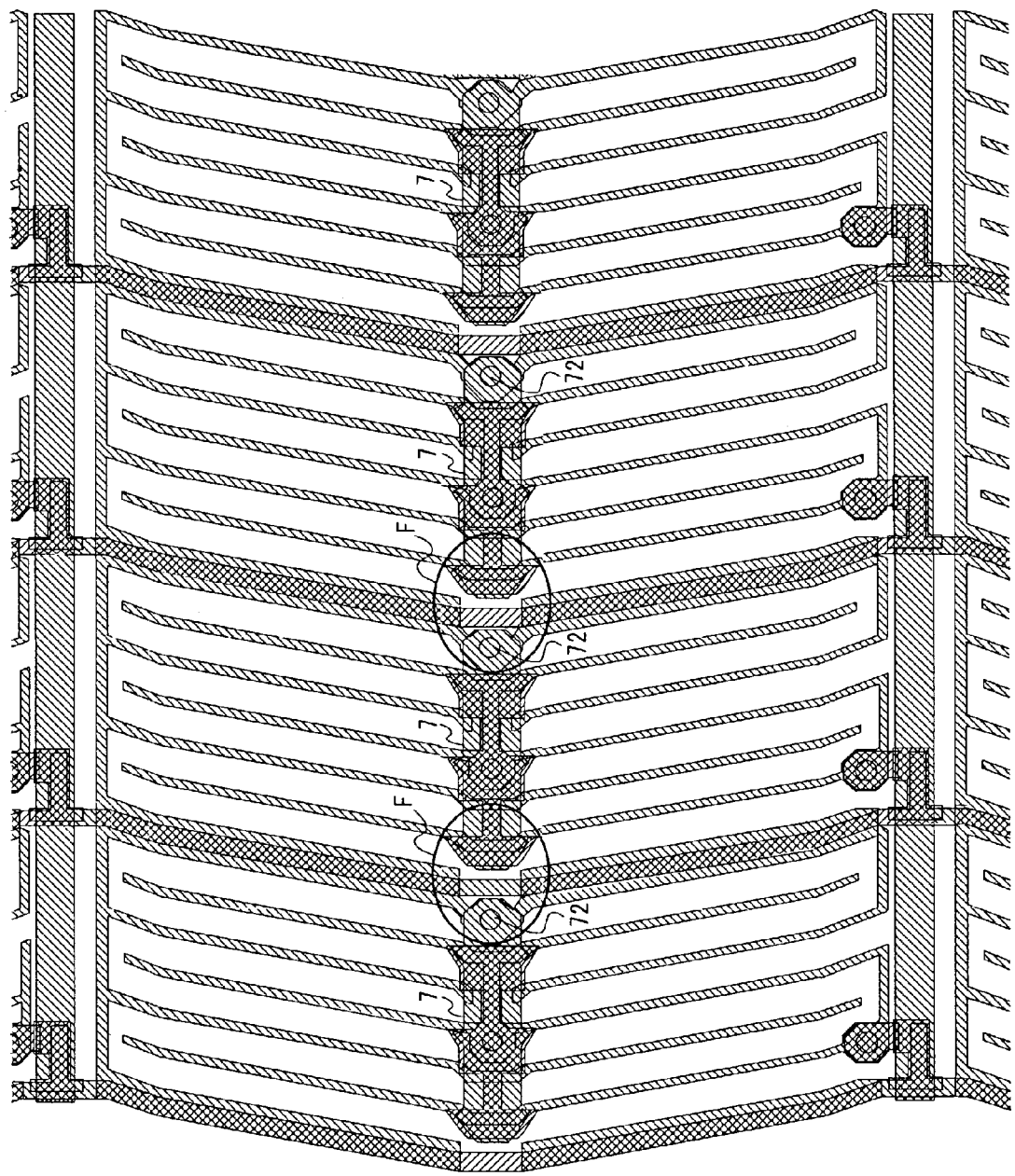
FIG. 12 is a view to show a pixel area of the liquid crystal display device according to the present invention.

FIG. 12 shows a configuration of a pixel area of a liquid crystal display device according to the sixth embodiment of the present invention. As shown in FIG. 12, the common capacitor line 7 is independent between laterally adjoining pixels. The common capacitor line 7 is connected to the common electrode 5 via a through hole 72, having the same electric potential. Therefore, there is no need that the common capacitor line is connected between laterally adjoining pixels, which allows an independent electrode pattern between pixels.

The common capacitor electrode pattern independent between pixels is arranged in the position not overlapped with the source line, as shown in an area F in FIG. 12. The number of steps over which the source line 3 crosses is thus reduced by half compared to the configuration in which the common capacitor electrode 7 is connected between adjoining pixels. This configuration reduces probability of breaking of the source line 3, and a short-circuit between the source line 3 and the common capacitor electrode 7, achieving high manufacturing yield.

As explained in the foregoing, the present invention provides a liquid crystal display device to prevent a short-circuit between a source line and a common electrode, and a method of manufacturing the same.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display device comprising:
a pair of substrates placed oppositely at a certain distance away from each other;
a liquid crystal layer placed between the substrates;
a gate line and a source line formed on one of the substrates, the gate line and the source line crossing each other;
a switching element connected to the gate line and the source line;
a comb-shaped pixel electrode connected to the switching element, the pixel electrode having a plurality of electrodes substantially parallel to the source line; and
a comb-shaped common electrode connected to the switching element, the common electrode having a plurality of electrodes parallel to and alternating with the plurality of electrodes of the pixel electrode,
wherein an electric field substantially parallel to the substrates is applied to the liquid crystal layer by a voltage applied across the pixel electrode and the common electrode, the comb-shaped pixel electrode and the comb-shaped common electrode are V-shaped, bent at a middle of a pixel, the common electrode is overlapped with the source line in an area except at the middle of the pixel, and the source line is overlapped with a part of the common electrode with an insulation film interposed therebetween, the insulation film having a plurality of layers of insulation film.

2. A liquid crystal display device comprising:
a pair of substrates placed oppositely at a certain distance away from each other;
a liquid crystal layer placed between the substrates;
a gate line and a source line formed on one of the substrates, the gate line and the source line crossing each other;
a switching element connected to the gate line and the source line;
a comb-shaped pixel electrode connected to the switching element, the pixel electrode having a plurality of electrodes substantially parallel to the source line; and
a comb-shaped common electrode connected to the switching element, the common electrode having a plurality of electrodes parallel to and alternating with the plurality of electrodes of the pixel electrode,
wherein an electric field substantially parallel to the substrates is applied to the liquid crystal layer by a voltage applied across the pixel electrode and the common electrode, there are at least two different values for an absolute value of an angle between the pixel electrode and a rubbing direction, an absolute value of an angle between an edge portion of the pixel electrode and the rubbing direction is greater than an absolute value of an angle between the other portion of the pixel electrode and the rubbing direction, and the source line is overlapped with a part of the common electrode with an insulation film interposed therebetween, the insulation film having a plurality of layers of insulation film.

3. A liquid crystal display device a pair of substrates placed oppositely at a certain distance away from each other;
a liquid crystal layer placed between the substrates;
a gate line and a source line formed on one of the substrates, the gate line and the source line crossing each other;
a switching element connected to the gate line and the source line;
a comb-shaped pixel electrode connected to the switching element, the pixel electrode having a plurality of electrodes substantially parallel to the source line; and
a comb-shaped common electrode connected to the switching element, the common electrode having a plurality of electrodes parallel to and alternating with the plurality of electrodes of the pixel electrode,
wherein an electric field substantially parallel to the substrates is applied to the liquid crystal layer by a voltage applied across the pixel electrode and the common electrode, a position where at least a part of side surfaces of the source line and a semiconductor layer of the switching element are aligned in a vertical direction is not on an area where the source line is overlapped with the common electrode, and the source line is overlapped with a part of the common electrode with an insulation film interposed therebetween, the insulation film having a plurality of layers of insulation film.

4. A liquid crystal display device comprising:
a pair of substrates placed oppositely at a certain distance away from each other;
a liquid crystal layer placed between the substrates;
a gate line and a source line formed on one of the substrates, the gate line and the source line crossing each other;
a switching element connected to the gate line and the source line;
a comb-shaped pixel electrode connected to the switching element, the pixel electrode having a plurality of electrodes substantially parallel to the source line; and
a comb-shaped common electrode connected to the switching element, the common electrode having a plurality of electrodes parallel to and alternating with the plurality of electrodes of the pixel electrode, wherein an electric field substantially parallel to the substrates is applied to the liquid crystal layer by a voltage applied across the pixel electrode and the common electrode, and the source line is overlapped with a part of the common electrode with an insulation film interposed therebetween, and the common electrode is not overlapped with the source line at the middle of the pixel.

5. A liquid crystal display device comprising:

a pair of substrates placed oppositely at a certain distance away from each other;

a liquid crystal layer placed between the substrates;

a gate line and a source line formed on one of the substrates, the gate line and the source line crossing each other;

a switching element connected to the gate line and the source line;

a comb-shaped pixel electrode connected to the switching element, the pixel electrode having a plurality of electrodes substantially parallel to the source line; and a comb-shaped common electrode connected to the switching element, the common electrode having a plurality of electrodes parallel to and alternating with the plurality of electrodes of the pixel electrode, wherein an electric field substantially parallel to the substrates is applied to the liquid crystal layer by a voltage applied across the pixel electrode and the common electrode, and a position where at least a part of side surfaces of the source line and a semiconductor layer of the switching element are aligned in a vertical direction is not on an area where the source line is overlapped with the common electrode.

* * * * *